No. 840,184. PATENTED JAN. 1, 1907.
J. W. WOOLVEN.
LID OF SAUCEPANS.
APPLICATION FILED NOV. 13, 1905.

UNITED STATES PATENT OFFICE.

JOHN WILLIAM WOOLVEN, OF PULBOROUGH, ENGLAND.

LID OF SAUCEPANS.

No. 840,184.

Specification of Letters Patent.

Patented Jan. 1, 1907.

Application filed November 13, 1905. Serial No. 287,177.

*To all whom it may concern:*

Be it known that I, JOHN WILLIAM WOOLVEN, of Ashington, Pulborough, in the county of Sussex, England, have invented new and useful Improvements in Connection with the Lids of Saucepans and the Like, of which the following is a specification.

This invention relates to improvements in connection with the lids of saucepans and the like, the object being to provide means for removing the lid by the use of one hand only and without danger of scalding the hand in use.

In carrying my invention into effect I proceed in, or in about, the following manner, making reference to the accompanying drawings, wherein—

Figure 1:
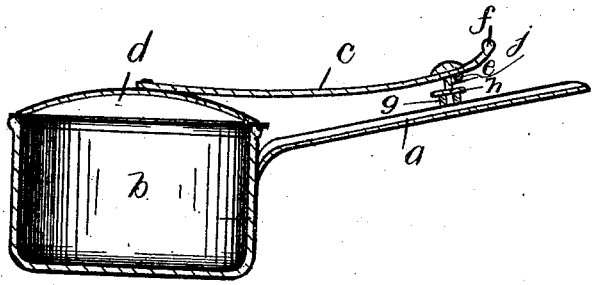
Figure 2:
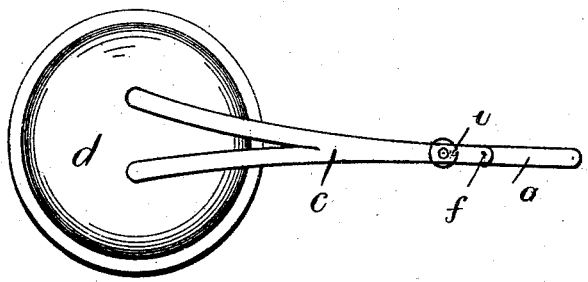

Figure 1 is a sectional side view, and Fig. 2 a plan.

To the ordinary handle $a$ of a saucepan $b$ I pivotally attach another handle $c$, fastened to the lid $d$, the mode of attachment of $a$ to $c$ being preferably by a stud $e$, on which the handle can be turned by pressure of the thumb on the upturned end $f$ of the handle $c$, the thumb being at the same time given a slight side movement.

On the stud $e$ and between $a$ and $c$ is a washer $g$, fastened to $d$ and having an outstanding rim $h$, in which is a notch $i$, and on the under side of $c$ is a hook $j$, which when $f$ is pressed down enters the notch $i$ and permits the lid to be moved from over the saucepan in its raised position owing to the hook sliding under the rim $h$.

What I claim, and desire to secure by Letters Patent, is—

The combination with the lid of a saucepan of a supplementary handle, one end of which is attached to the lid, the said supplementary handle being above the ordinary handle of the said saucepan and having an upturned outer end, a stud on the saucepan-handle passing freely through a hole in the supplementary handle, a washer between the two handles, the said washer having an upstanding rim in which is a notch, and a hook on the supplementary handle to be inserted in the said notch when the lid is required to be retained in its raised position.

In testimony whereof I have signed my name to the specification in the presence of two subscribing witnesses.

JOHN WILLIAM WOOLVEN.

Witnesses:
GEORGE TIDEY,
GEORGE BUTCHER.